INVENTOR:
William Blackmore
BY Clarence D Kerr
HIS ATTORNEY

Feb. 2, 1937. W. BLACKMORE 2,069,488
JOURNAL BOX
Filed July 2, 1932  6 Sheets-Sheet 4
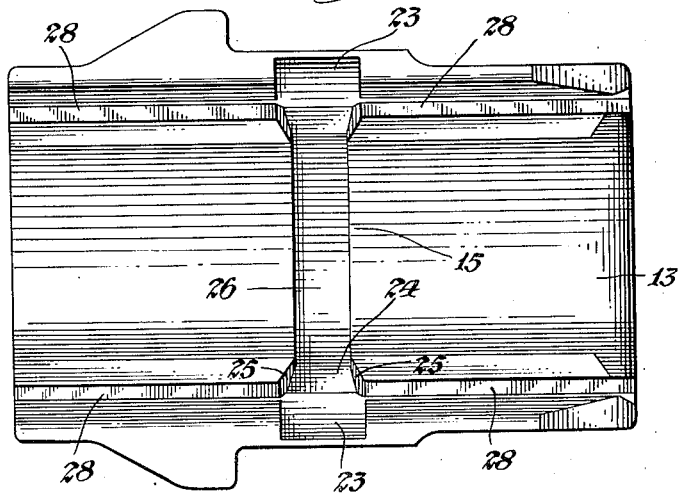
Fig. 5.
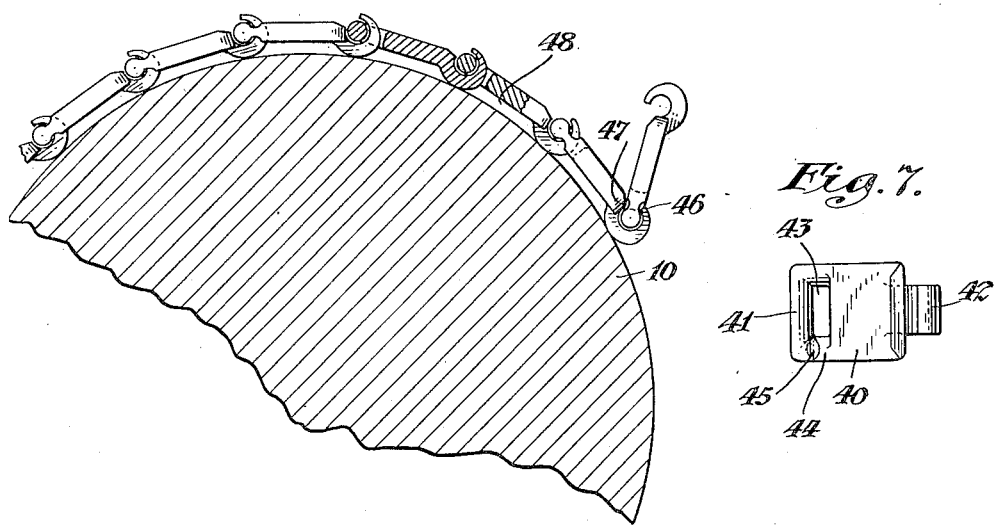
Fig. 6.
Fig. 7.
INVENTOR:
William Blackmore
BY Clarence D Kerr
HIS ATTORNEY

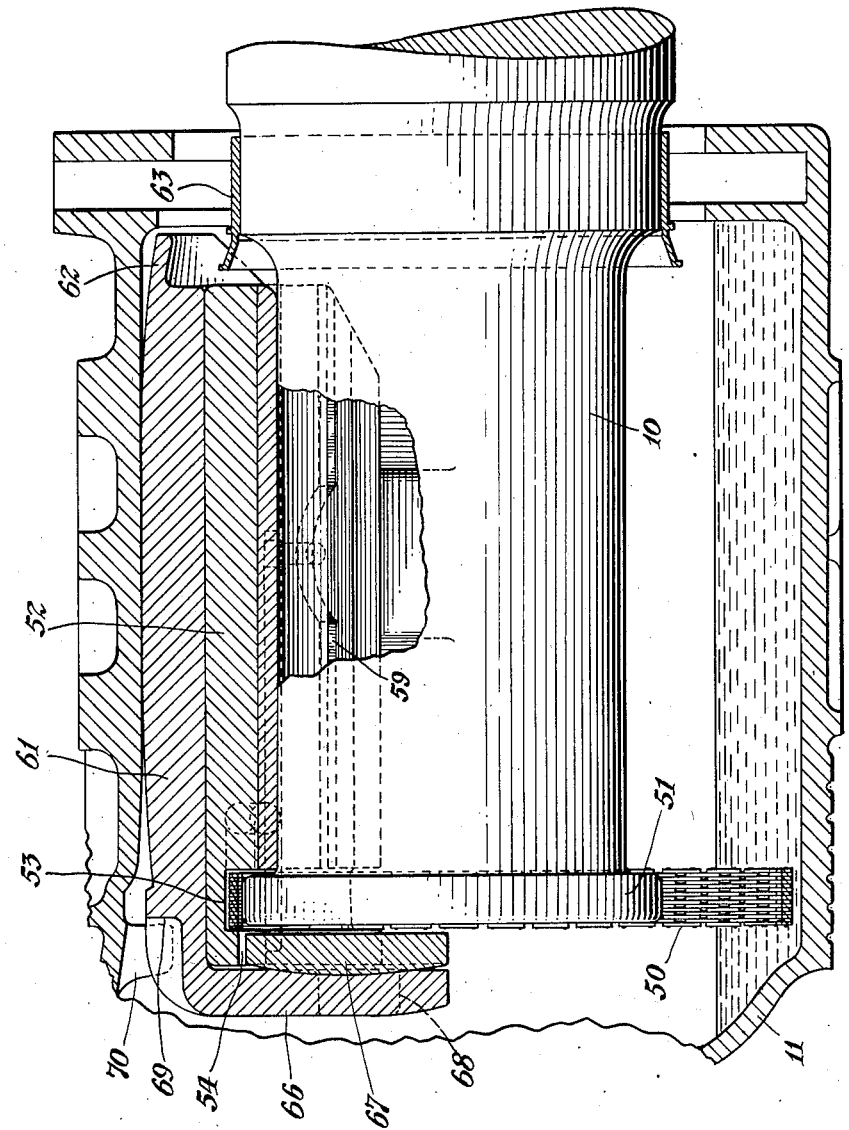

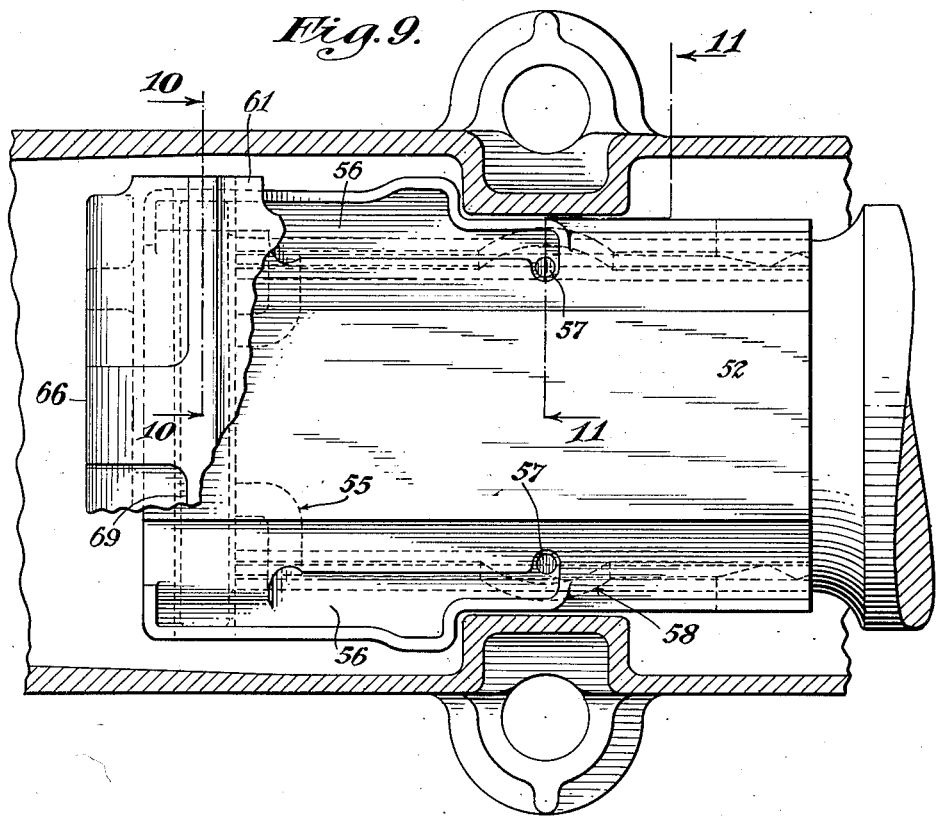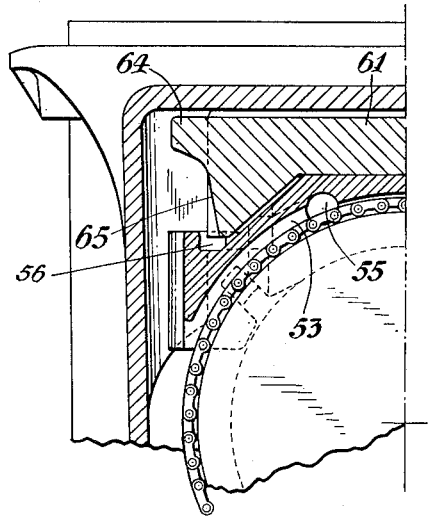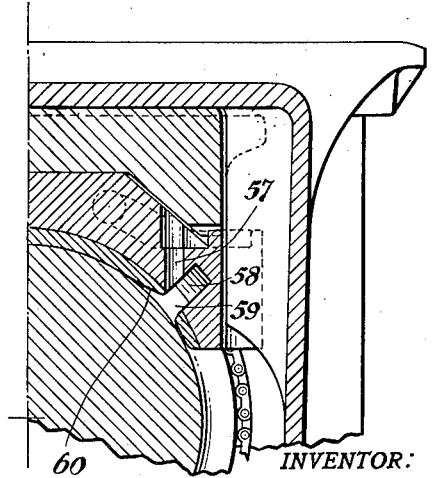

Patented Feb. 2, 1937

2,069,488

UNITED STATES PATENT OFFICE 2,069,488

JOURNAL BOX

William Blackmore, Sharon, Pa., assignor to National Malleable and Steel Castings Company, Cleveland, Ohio, a corporation of Ohio Application July 2, 1932, Serial No. 620,682

5 Claims. (Cl. 308—85)

This invention relates to improvements in journal boxes and has particular reference to the provision of effective means for lubricating the bearing surfaces. The invention is especially concerned with a construction of the plain bearing type but certain of its features are applicable also to roller bearing boxes.

It is a primary purpose of the present invention to provide a forced or flood lubrication system of a particularly effective nature by which a continuous flow of oil is maintained over the bearing surfaces at all speeds of rotation of the journal. Toward this end there is provided a chain of special construction carried by the journal and adapted to be kept in motion by the rotation of the journal to carry oil from a reservoir at the bottom of the box to distributing means at the top of the journal. A chain having a broad surface adapted to convey large amounts of oil is necessary to supply adequate lubrication over a wide range of speeds. An important feature of the improved chain is its construction in such a way that it will not tend to cling to the under side of the journal and will function properly at all times. It has been found that chains not properly constructed tend to produce a partial vacuum between the inner face of the chain and the surface of the journal. This seriously interferes with the proper functioning of the chain. By the present invention this tendency to create a vacuum is overcome.

Another feature of the invention as applied to a box of the plain bearing type is the special construction of the brass in such a way as to most effectively remove the oil carried up by the chain and distribute it along successive portions of the surface of the journal as these portions pass into load bearing position.

An improved wedge construction is also contemplated. Among the novel features of the wedge in one embodiment of the invention, is the formation of the latter in such a way that it cooperates with the brass to provide for adequate lubrication of the journal at high speeds. The construction is such that when the journal is operated at relatively slow speeds the lubricant is distributed by the simple cooperation between the brass and chain. When the journal is operated at higher speed there is a tendency of the chain to throw the oil from its surface. The improved wedge at this time assists in the collection and distribution of a portion of the oil thus thrown from the chain. A further feature of the wedge is its special formation at the inner end adjacent the inner end of the box whereby oil thrown from the journal by an obturating ring will be rapidly returned to the reservoir at the bottom of the box and will be prevented from leaking out of the box.

Other features and advantages of the invention will become apparent from the detailed description of several illustrative embodiments of the same which will now be given in conjunction with the accompanying drawings in which:

Figure 5 is a bottom view of a brass used in the improved construction.

Figure 6 is an enlarged detail view showing a modified form of chain which may be used.

Figure 7 is a detail view of one of the links used in the modified form of chain.

Figure 8 is a view similar to Figure 1 showing a modified form of brass and wedge construction.

Figure 9 is a horizontal sectional view through the box shown in Figure 8 with a portion of the wedge broken away to disclose the top of the brass.

Figure 10 is a partial, vertical section through the box taken along the line 10—10 of Figure 9, and Figure 11 is a similar view taken along the line 11—11 of Figure 9.

Figure 1:
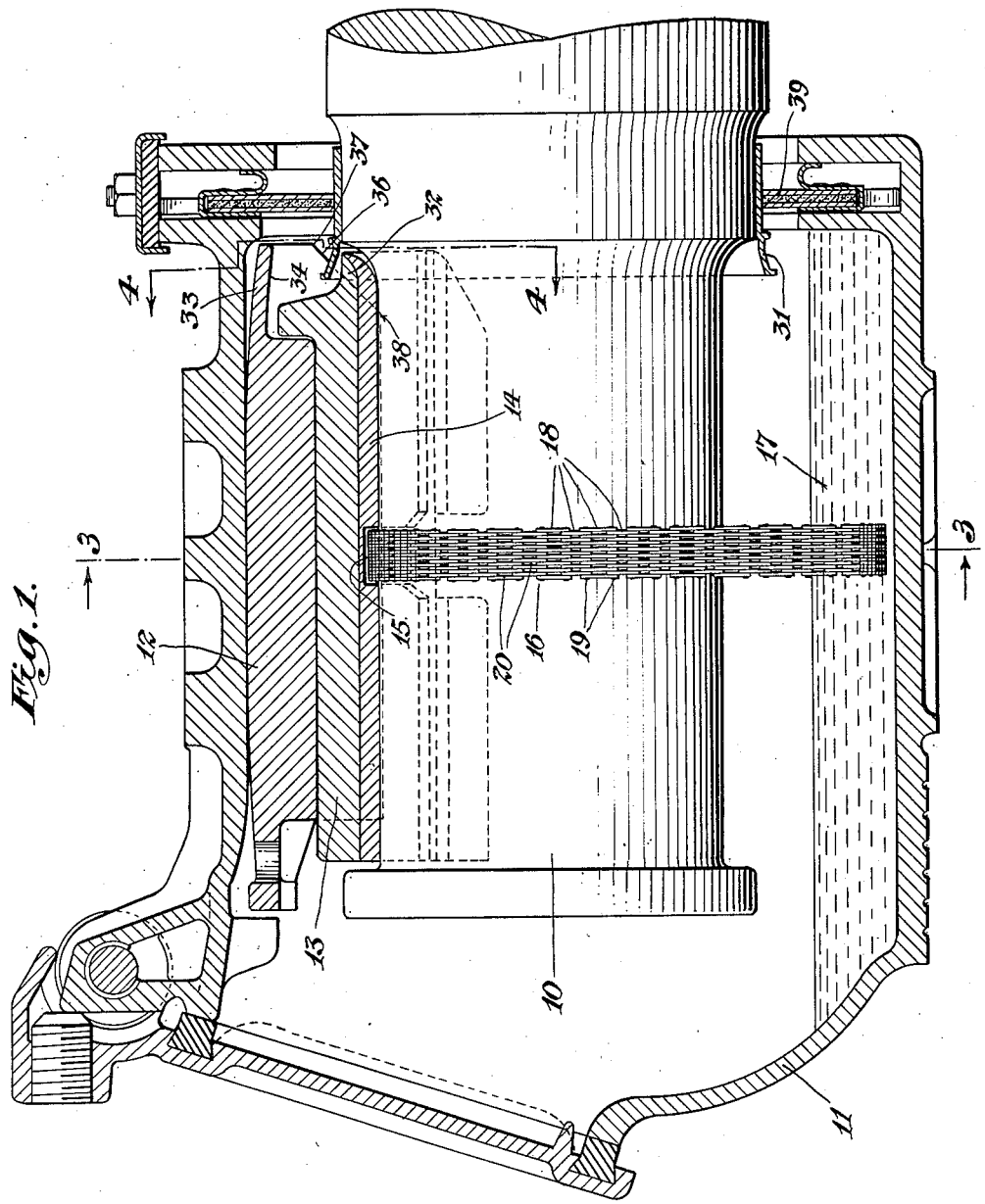
Figure 1 is a longitudinal, central, vertical section through a box embodying the invention, applied to the end of an axle.
Figure 2:
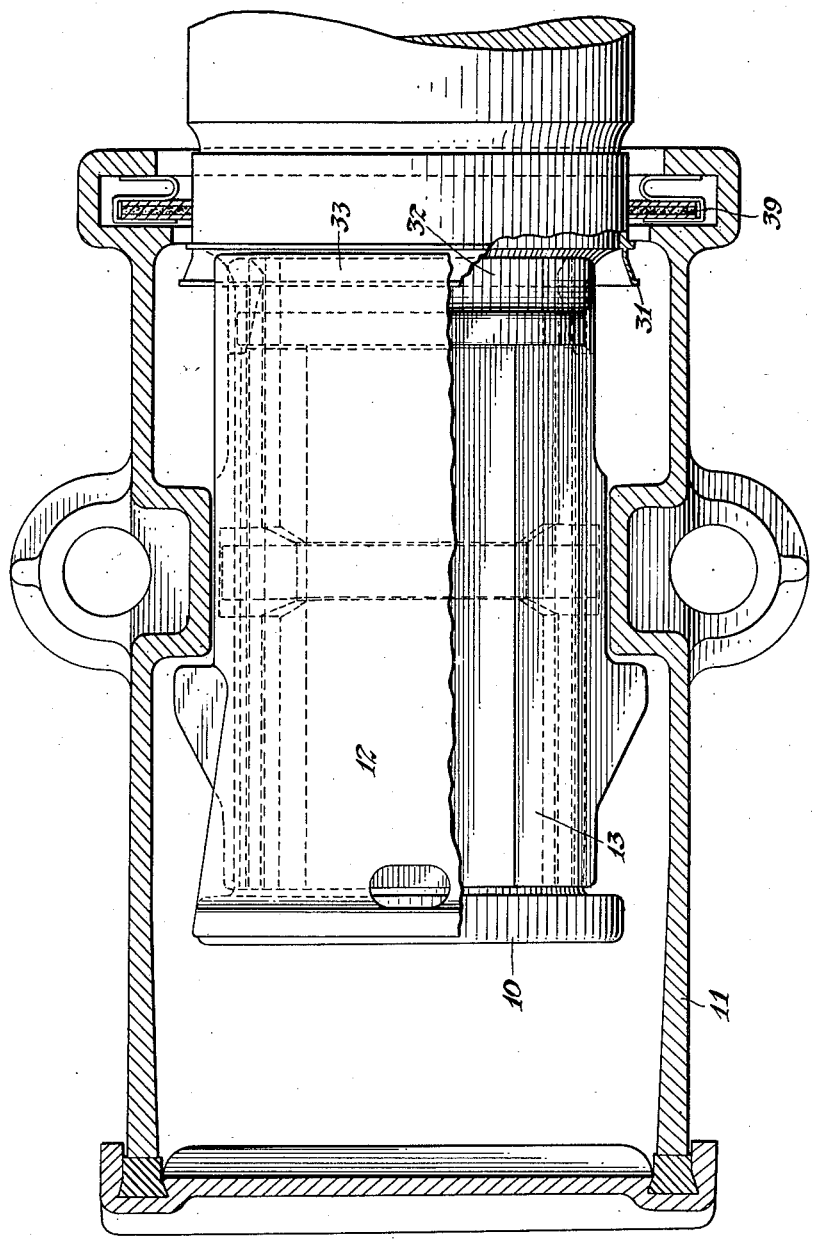
Figure 2 is a longitudinal, horizontal section through the box of Figure 1 with certain parts broken away to more clearly disclose the construction.

Referring now to the drawings, and particularly to Figures 1 to 5, inclusive, one embodiment of the invention as applied to a plain bearing box is illustrated. Over the end of the journal 10 there is applied a box 11 which has preferably such standard outside dimensions as to be adapted to fit into standard frames designed for plain bearing boxes. In lieu of forming the journal box as a separate unit it might be formed as an integral part of a standard side frame structure, if desired. Between the under surface of the top of the box and the top of the journal there is provided a wedge 12 and a brass 13 through which the load of the side frame of the car will be transmitted to the journal. The under surface of the brass which bears upon the axle is suitably lined with babbitt, or the like, as indicated at 14.

About midway between the ends of the brass a groove 15 is provided transversely of the same. This, as indicated in Figure 1, is primarily cut into the babbitt lining but at points, particularly at the sides of the brass, is also cut into the metal of the brass itself. A chain 16 is supported by the journal in the plane of the groove 15 and forms a comparatively snug fit with the side walls of the groove at the top of the journal. Just sufficient clearance should be provided in the groove to permit free movement of the chain through it. Clearance between the top of the chain and the groove should be great enough to allow for some wear of the babbitt. The lower portion of the chain dips into a bath of oil 17 carried in a reservoir at the bottom of the box.

Figure 3:
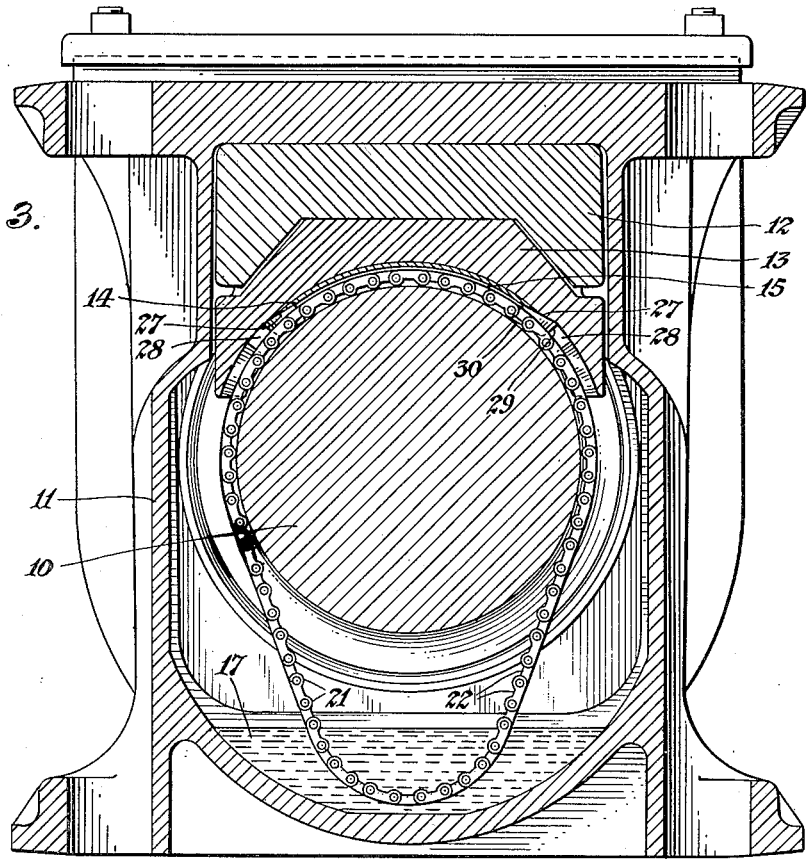
Figure 3 is a vertical section through the box taken along the line 3—3 of Figure 1.
Figure 4:
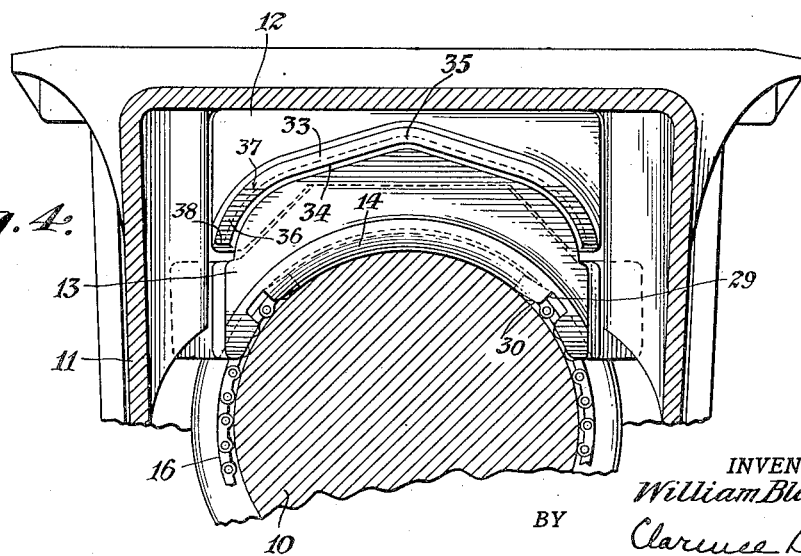
Figure 4 is a vertical section taken through a portion of the box along the line 4—4 of Figure 1.

In Figures 1, 3, and 4, the chain employed is shown as being constructed of a series of separate, thin links 18 connected together by a series of pivot pins 19. The links are so connected as to form a comparatively solid mat having, however, a series of relatively small openings 20 through the mat. For this purpose the links are arranged in a series of groups, those in each group being placed side by side and the ends of the links of one group fitting between the ends of those of the next group in the series. Each of the links 18 is provided with a pair of projections 21 through which the pivot pins 19 are passed. Between the projections 21 there is a space 22 which, in the grouping of the links, forms a passage extending transversely across the chain. If desired the projections 21 may be more or less pointed so as to further reduce the areas of contact between the projections and the surface of the journal. The provision of the transverse passages or open channels 22 is important. For example, if the chain were turned inside out and the comparatively smooth, outer surface of the chain were applied to the journal, it would be found that a partial vacuum would be created between the chain and journal which would tend to cause the chain to cling to the surface of the journal. Therefore, instead of dipping into the oil bath in the manner indicated in Figure 3, the downwardly moving side of the chain would cling to the surface of the journal around to a point adjacent the upwardly moving side of the chain with the result that there would be insufficient slack to permit the chain to extend into the oil bath. However, by the provision of only a small surface contact between the chain and the journal, practically only a line contact at each projection 21, and the provision of air passages through the chain, which will equalize the air pressure on the two sides of the latter, the tendency of the chain to cling to the journal is overcome. The type of chain illustrated in Figures 1, 3, and 4 is well suited for the purpose inasmuch as it presents a large oil carrying surface and at the same time provides for the desired free access of air. While an open link chain will function in a fairly satisfactory way at slow speeds is will be found that under the modern high speed operations insufficient lubricant will be supplied by such a chain. It is necessary, therefore, in order to insure ample lubrication under all conditions to provide a flat chain having a comparatively large oil carrying surface.

Referring particularly to Figs. 3 and 5, it will be noted that the groove 15 extending transversely across the brass 13 is enlarged at its ends, as indicated at 23. The enlarged portions 23 of the groove are connected by tapered portions 24, having inwardly tapering side walls 25, with the narrower, central portion 26. The intermediate section 24 of the groove has also a tapered or sloping top surface 27. It will be seen, therefore, that the chain on the upwardly moving side of the journal first enters the comparatively large recess or pocket 23 and is then drawn through the tapered portion 24 into the restricted passage 26. Within the passage 26 there is a compartively snug fit between the sides and top of the chain and the adjacent faces of the groove. Only sufficient clearance is provided to insure free movement of the chain through the groove and to allow for wear of the babbitt. At the recesses 23 there is a considerable clearance not only at the sides of the chain but also above the latter so that the oil is freely carried into one or the other of these recesses. The effect of the inclined or tapered surfaces 25 and 27 of the intermediate sections is to remove the oil from the sides and top of the chain and provide an accumulation of oil in the recess 23 on the upwardly moving side of the chain. In communication with the upper end of this recess there is provided a pair of grooves 28 which extend longitudinally of the brass and serve to convey the oil throughout the length of the brass. The upper side walls 29 of the grooves 28 terminate, preferably, a slight distance radially outward from the surface of the journal. An inclined surface 30 serves to connect the inner ends of the walls 29 of the grooves with that portion of the brass which bears directly upon the journal. During the rotation of the journal sufficient oil will be carried up by the chain to maintain an ample supply in the recess 23. This oil will be distributed throughout the length of the grooves 28 and will be effectively spread over each successive portion of the journal as the latter is carried into the load-bearing portion of its travel. The more rapid the rotation of the journal, the greater will be the demand for lubrication and the greater will be the supply of lubricant available in the grooves 28. Under all speeds of rotation there will be an ample supply of lubricant and, in fact, at the higher speeds, when the lubrication requirements are most severe, there will be a flood of excess oil which will simply be returned to the reservoir from the lower end of the recess 23. A sufficient oil pressure will be built up in the operation of oil pressure will be built up in the operation of the chain to insure forcing the lubricant to the extreme ends of the grooves 28. It will be apparent that by duplicating the construction at the two sides of the brass, proper lubrication will be effected upon rotation of the journal in either direction.

To prevent the leakage of oil from the box at the inner end where a comparatively large opening is required around the journal, there is provided an obturating ring 31 having a sleeve portion pressed over a part of the journal and having an outwardly flared portion extending into the box. This ring is rotated with the journal and passes through the space provided between an extension 32 of the brass and an extension 33 of the wedge. The under surface of the wedge extension, as best shown in Figure 4, is in the form of a Gothic arch 34 having a peak 35. The sides of the arch slope rather abruptly from this peak so that the tendency of the oil to accumulate and remain at the top of the surface 34 is overcome. If the surface 34 were a portion of a cylinder, instead of being peaked as shown, oil would collect at the top and would drip directly therefrom. Some of this would fall upon the outer surface of the ring 31 and would find its way out along the journal. On the other hand any oil which is thrown against the peaked surface during the rotation of the journal will flow quickly to one side or the other down to the lower edge 36. This, furthermore, as indicated in Figure 1, is inclined downwardly and toward the center of the box from an upper corner 37 to a lower corner 38. Therefore, any oil thrown against the surface 34 will flow freely and quickly down to the point 38 from which it will drop onto the brass and find its way back to the oil reservoir. The danger of dropping oil from the top of the box or the wedge onto the outer face of the obturating ring will in this way be obviated. A sealing member 39 surrounds the sleeve of the obturating ring and fits into a recess in the inner end of the box so as to prevent the access of dust and also assist in preventing the escape of oil.

In Figures 6 and 7 there is shown a modified chain construction. As here illustrated the chain may be formed of a series of interconnected links each having a main, flat body portion 40 with a looped portion 41 at one end and a hooked portion 42 at the opposite end. The looped portion has an opening 43 adapted to receive the hook 42 of the next link. One of the arms 44 of the looped portion is notched on its upper and lower sides, as indicated at 45. This permits easy assembly of a pair of links by tilting them into the relative positions shown at the right hand side of Figure 6. When tilted into this position it will be apparent that the notches 45 will permit the two links to be slid transversely into or out of connected position. The end 46 of the hook and the opposite corner or shoulder 47 of one link will slide through the notches 45 of the other link. When a series of links are assembled and operatively arranged, as indicated in Figure 6, there is no danger whatever of their becoming accidentally separated. It will be noted that due to the form of each link, a transversely extending passage 48 is provided beneath each link between its hook 42 and the hook of the connected link. This, as in the first form of chain disclosed, prevents the formation of a partial vacuum between the chain and the journal and thus prevents the sticking of the chain to the journal in the lower portion of its travel. This form of chain may be used, if desired, in the same way as and in lieu of the chain 16 and it will be found to very effectively provide the desired lubrication.

In Figures 8 to 11, inclusive, there is shown a further modification. The oil conveying chain 50 in this embodiment of the invention is mounted upon the collar 51 at the outer end of the journal. A brass 52, mounted on the journal, is provided with an extension over the collar 51 having a recess or pocket 53 for the reception of a portion of the chain. A downwardly extending flange 54 at the forward end of the brass serves to complete the pocket 53 so as to effectively retain the chain on the collar. Oil carried upwardly from the reservoir at the bottom of the box enters a portion of the recess 53 which has a considerable clearance from the outer surface of the chain and thus forms an oil accumulating pocket. The upper end of this portion of the recess communicates with a channel or passage 55 which in turn communicates with a small reservoir or channel 56 in the top of the brass. That portion of the recess 53 above the passage 55 is so restricted in cross sectional area that the oil will be wiped from the outer surface of the chain upon entering this part of the recess and will be forced through the passage 55 into the channel 56. A small passage 57 about half way between the ends of the brass will convey the oil from the channel 56 to a pocket 58, which is in open communication with the surface of the journal and is connected with grooves 59 extending longitudinally of the journal for the purpose of distributing the oil in the same manner as the grooves 28 in the first form of the invention. An inclined surface 60 is provided adjacent the upper side of the groove 59 to insure a more abundant supply of the lubricant along the journal, and to retain some oil when the journal stops rotating, which oil is then available for lubrication as soon as rotation starts again and before oil is carried to the journal by the chain.

Above the brass is provided a wedge 61 cooperating with the undersurface of the top of the box in the usual manner. At its inner end the wedge is provided with an extension 62 similar to the extension 33 of the wedge 12. This extension, as in the first embodiment, is preferably provided with an under surface formed as a Gothic arch arranged to convey the oil thrown against it back to the reservoir as quickly as possible. The lower edges of extension 62 are so arranged that the oil is conducted away from a shield or obturating ring 63 carried by the journal. Adjacent the forward end, in the plane of the chain 50, the wedge is provided with lateral extensions 64 adapted to collect the oil which is thrown from the chain toward the top of the box. This oil may be thrown directly against the projection 64 or may drip onto this projection from the top of the box. A surface 65 connected with the under side of each projection 64 extends downwardly into the channel 56 and thus serves to convey the oil collected by the projection into the channel for distribution in the same manner as the oil conveyed directly by the chain to the passage 55. It will be apparent that when the journal rotates slowly, the oil will be delivered into the channel 56 directly through the passage 55 from the pocket or recess 53. When the journal is rotated more rapidly, however, some of the oil will be thrown from the outer face of the chain and from other surfaces and a portion of this oil will reach the projection 64 of the wedge. This will be supplied to the channel 56 by the surface 65. At high speeds a large percentage of the oil distributed along the journal, in this construction, will be supplied in this way. For example at speeds of 70 to 80 miles per hour a continual jet or stream of oil will be thrown to the top of the box and will be deflected into the channel 56.

At its forward end the wedge 61 is provided with a flange or downward extension 66 projecting over the end of the journal and adapted to receive and retain a thrust block 67. The latter is provided with projections fitting into recesses 68 in the flange 66. Block 67 is preferably formed with a spherical face cooperating with a spherical seat in the extension 66 while it has, at the same time, a flat face in cooperation with the end of the journal. This will provide for equalization of the relative thrust between the box and journal even though they may be angled somewhat relative to each other. The thrusts are transmitted by shoulders 69 on the wedge to lugs 70 on the box and from the latter may be passed in the usual way to the side frame.

While several specific embodiments of the invention have been disclosed in considerable detail, it will be understood that these are illustrative only and that numerous changes may be made in the specific details of construction and the arrangement of the parts without departing from the general principles and scope of the invention. The terms and expressions used herein are for purposes of description and are not intended to impose any unnecessary limitations upon the invention.

What I claim is:

1. In a structure of the class described a journal box, a journal extending into said box and having a collar at its end, an oil conveying chain carried by said collar, a bearing member between said box and journal, and means on said member comprising surfaces forming a passage constricted toward the top of said journal for retaining said chain in position on said collar and for distributing oil conveyed by said chain to the bearing surface of said journal, certain of said surfaces converging toward the sides of the chain near the top of the journal.

2. In a structure of the class described a journal box, a journal extending into said box and having a collar at its end, an oil conveying chain carried by said collar, projections on said chain engaging said collar to hold the main body of the chain spaced from the collar, a bearing member between said box and journal, and means on said member for retaining said chain in position on said collar and for distributing oil conveyed by said chain to the bearing surface of said journal, said means comprising surfaces on the member converging toward the sides of the chain near the top of the journal.

3. In a plain bearing journal box structure a box having an oil reservoir and adapted to receive the end of a journal, a brass carried by the journal, a wedge between the brass and the box, oil conveying means on the journal depending into said reservoir, oil distributing channels in said brass arranged to receive oil directly from said means, and means on said wedge in the plane of rotation of said oil conveying means for conveying additional oil to said channels.

4. In a plain bearing journal box structure a box having an oil reservoir and adapted to receive the end of a journal, a brass carried by the journal, a wedge between the brass and the box, oil distributing channels in said brass, surfaces on said wedge in the plane of rotation of said oil conveying means for conveying oil to said channels, and a chain carried by said journal and adapted to convey oil from said reservoir to said channels, in part directly and in part by said wedge surfaces.

5. In a plain bearing journal box structure a box having an oil reservoir and adapted to receive the end of a journal, a brass carried by the journal, a wedge between the brass and the box, oil distributing channels in said brass, a chain carried by said journal and arranged to force oil directly into said channels, said wedge having oil deflecting surfaces in the plane of rotation of said chain adapted to direct oil thrown from said chain into said channels.

WILLIAM BLACKMORE.